Aug. 20, 1935.          W. S. SNOW          2,011,693
DEMOUNTABLE WHEEL
Filed May 4, 1934
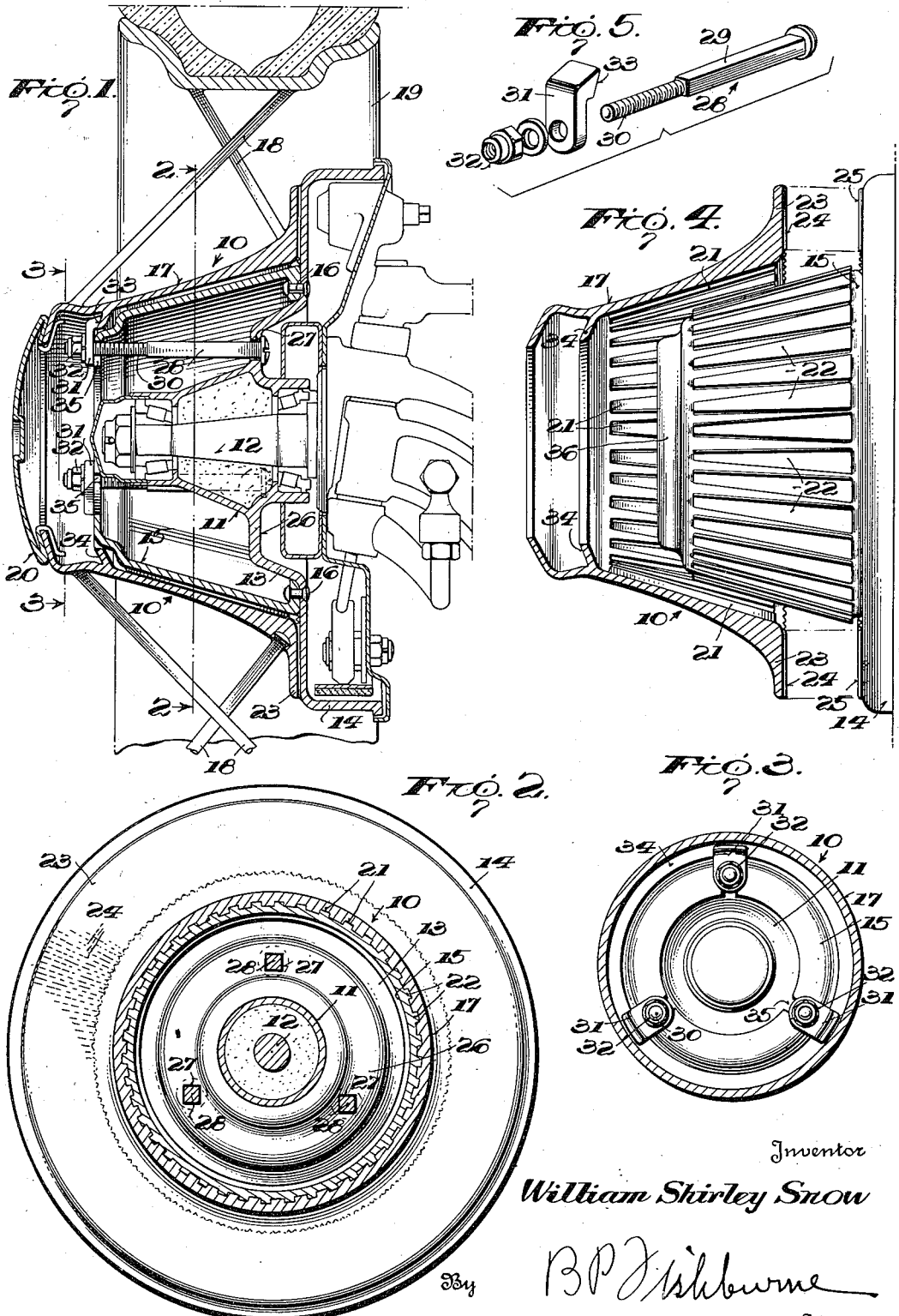
Inventor
William Shirley Snow
By B P Fishburne
Attorney Patented Aug. 20, 1935

2,011,693

UNITED STATES PATENT OFFICE 2,011,693

DEMOUNTABLE WHEEL

William Shirley Snow, Shawnee, Okla.

Application May 4, 1934, Serial No. 723,967

9 Claims. (Cl. 301—9)

My invention relates to demountable wheels for automobiles or the like.

An important object of the invention is to provide means whereby the wheel may be removed from the axle, without removing any part of the wheel, excepting the wheel cap.

A further object of the invention is to provide a demountable wheel which is of simple and practical construction, formed of few parts, which is easy to manipulate, and reliable in use.

A further object of the invention is to provide a demountable wheel so constructed that it may be placed into position without the necessity of turning the wheel to any considerable extent.

Other objects and advantages of the invention will be apparent during the course of the following description.

In the accompanying drawing forming a part of this specification and in which like numerals are employed to designate like parts throughout the same, Figure 1 is a central vertical transverse section through a demountable wheel embodying my invention, Figure 2 is a longitudinal section taken on line 2—2 of Figure 1, parts omitted, Figure 3 is a similar view taken on line 3—3 of Figure 1, Figure 4 is a central vertical longitudinal section through the wheel hub, associated elements being omitted and the axle hub member being shown in elevation, and, Figure 5 is a perspective view of one of the bolts.

In the drawings wherein for the purpose of illustration is shown a preferred embodiment of my invention the numeral 10 designates an axle hub member, as a whole, comprising an inner axle hub 11, which is rotatably mounted upon the spindle 12 of the axle, in any well known or preferred manner. Preferably formed integral with the inner hub 11 is a disk 13, carrying the usual brake drum 14. Disposed upon the outer side of this disk is a hub drum 15, rigidly attached thereto by means of rivets 16 or by any other suitable means. This hub drum is circular in cross-section, and concentric with the disk 13 and brake drum 14, and tapers outwardly, as shown.

The numeral 17 designates a wheel hub, carrying spokes 18, which are secured to a rim 19. While I have shown a wire wheel the invention is not restricted to any particular type of wheel. The wheel hub 17 has its inner and outer ends open and its outer end is adapted to be covered by a removable cap 20.

The wheel hub 17 is circular in cross-section and tapers outwardly and is adapted to be inserted upon the hub drum 15. The wheel is preferably provided upon the inner side of its periphery with longitudinally extending grooves 21, which are preferably longitudinally tapered, decreasing in width outwardly, and these grooves receive tapered longitudinal ribs 22, adapted to fit therein. The ribs 22 cause the wheel hub and hub drum to interlock against relative rotary movement, and also preferably retain the wheel hub and hub drum 15 radially spaced. Due to the tapered arrangement of the wheel hub 17 and hub drum 15 and the associated elements these parts may be readily separated. The number of interfitting grooves 21 and ribs 22 may be varied, and these parts may also be varied in size and shape, as may be found advantageous. I also contemplate providing the wheel hub 17 with a radially extending flange 23, at its inner end, and to provide the inner side of this flange with ribs or teeth 24, to interfit with ribs or teeth 25, formed upon the outer face of the disk 13. These interfitting ribs or teeth constitute means to prevent relative turning movement between the wheel hub 17 and the hub member 10, and if desired, the ribs 22 and grooves 21 may be used alone, or in combination with the interfitting teeth 24 and 25, or the interfitting teeth 24 and 25 may be used without the ribs 22.

The disk 13 is provided with an outwardly bulging annular portion 26, having openings 27 formed therein which are preferably square in cross-section. Adapted for insertion within the openings 27 are locking bolts 28, having portions 29 which are square in cross-section and are loosely held in the openings 27, so that the bolts may be laterally swung therein, within limits, but cannot turn therein upon their longitudinal axes. The bolts 28 have outer reduced cylindrical screw-threaded portions 30, carrying locking lugs 31, and nuts 32. The lugs 31 are provided at their outer ends with inclined jaws 33, engaging over the outer faces of an annular flange 34, arranged within the wheel hub 17, and preferably formed integral therewith. The screw-threaded extensions or portions 30 of the locking bolts pass through radial slots 35, formed in the flange 36 of the hub drum 15. The flange 36 is pressed inwardly with respect to the hub drum 15, and is permanently spaced from the flange 34.

When the wheel is in position upon the hub member 10 the lugs 31 have clamping engagement with the flange 34, and the wheel hub 17 cannot move longitudinally with respect to the hub member 10. To remove the wheel, the bolts 32 are unscrewed for a suitable distance but not removed from the bolts 29. This will permit the jaws 33 of the lugs 31 to clear the transversely inclined flange 34, whereby the bolts 29 may be swung inwardly, such bolts swinging laterally within the openings 27. The bolts may now be swung inwardly out of the slots 35. The wheel hub 17 may now be shifted longitudinally outwardly and removed from the hub member 10. The opposite of this operation takes place when the wheel hub 17 is returned upon the hub member.

It is to be understood that the form of my invention herewith shown and described is to be taken as a preferred example of the same and that various changes in the shape, size, and arrangements of parts may be resorted to without departing from the spirit of my invention or the scope of the sub-joined claims.

Having thus described my invention what I claim is:

1. In a demountable wheel, a hub member including a hub drum provided at its outer end with an inwardly directed flange having generally radial slots, a wheel including a wheel hub detachably mounted upon the hub drum, a flange on the inner surface of the wheel hub and having a transversely inclined outer face, bolts extending longitudinally within the hub member and loosely connected therewith at their inner ends so that they may be swung laterally, the arrangement being such that the bolts are held against turning movement upon their longitudinal axes and may be moved into the generally radial slots, lugs mounted upon the bolts and having inclined faces to engage the inclined face of the last named flange, and nuts carried by the bolts to engage the lugs.

2. In a demountable wheel, a hub member including a hub drum and a disk at the inner end of the hub drum, said hub drum being provided at its outer end with an inwardly directed flange having generally radial slots, a wheel including a wheel hub detachably mounted upon the hub drum, a flange on the inner surface of the wheel hub and having an inclined outer face and being spaced from the first named flange, bolts loosely connected with the disk and adapted to be shifted into the slots, lugs carried by the bolts and having inclined faces to engage the inclined face of the flange of the wheel hub, nuts carried by the bolts to engage the lugs, and interlocking means to prevent relative rotary movement between the wheel hub and hub drum.

3. In a demountable wheel, a hub member including an inner axle hub and a hub drum surrounding the inner axle hub in spaced relation for affording a passage between the same, a wheel including a wheel hub to be mounted upon the hub drum, said wheel hub having a lug engaging part near its outer end, bolts extending longitudinally within the passage and connected with the hub member, lugs adjustably mounted upon the bolts for detachable engagement with the lug engaging part, and nuts having screw-threaded engagement with the bolts for engagement with the lugs.

4. In a demountable wheel, a hub member including an inner axle hub and a hub drum surrounding the inner axle hub in spaced relation for affording a passage between the same, a wheel including a wheel hub to be mounted upon the hub drum, said wheel hub having a lug engaging part, bolts extending longitudinally within the passage between the inner axle hub and hub drum and connected with the hub member so that they may be swung laterally with relation thereto, lugs adjustably mounted upon the bolts for engaging the lug engaging part, and nuts having screw-threaded engagement with the bolts to engage the lugs.

5. In a demountable wheel, a hub member including an inner axle hub and a hub drum surrounding the inner axle hub in spaced relation for affording a passage between the same, a wheel including a wheel hub to be mounted upon the hub drum, said wheel hub having a radially inwardly directed part, bolts extending within the passage between the inner axle hub and hub drum and connected with the hub member, lugs adjustably mounted upon the bolts and arranged to engage the inwardly directed part of the wheel hub, and nuts carried by the bolts to engage the lugs.

6. In a demountable wheel, a hub member including a hub drum provided near its outer end with a radially inwardly directed flange having generally radial slots, a wheel including a wheel hub removably mounted upon the hub drum, a radially inwardly directed flange carried by the wheel hub, bolts extending longitudinally of the hub member and connected at their inner ends with the hub member so that they may be swung laterally and brought into the generally radial slots, lugs mounted upon the bolts to engage with the flanges, and nuts carried by the bolts to engage the lugs.

7. In a demountable wheel, a hub member including a hub drum and a disc at the inner end of the hub drum, said hub drum being provided near its outer end with a radially inwardly directed flange having generally radial slots, a wheel including a wheel hub removably mounted upon the hub drum and provided with a radially inwardly directed flange, bolts adjustably connected with the disk and adapted to be shifted into the slots, lugs carried by the bolts to engage the flanges, nuts carried by the bolts to engage the lugs, and interlocking means to prevent relative rotary movement between the wheel hub and hub drum.

8. In a demountable wheel, a hub member including a hub drum, a wheel including a wheel hub removably mounted upon the hub drum and having a laterally directed flange which is disposed inwardly of the outer end of the wheel hub, bolts extending longitudinally within the hub drum and secured to the hub member, lugs carried by the bolts to engage the flange, nuts carried by the bolts to engage the lugs, the arrangement being such that the outer end of the wheel hub is left free for engagement with a cap.

9. In a demountable wheel, a hub member including an inner axle hub and a hub drum spaced radially from the inner axle hub for forming a passage between the same, a wheel including a wheel hub removably mounted upon the hub drum and having a laterally directed portion which is disposed inwardly of the outer end of the wheel hub, holding means bodily mounted within the passage between the hub drum and the inner axle hub connected with the latter hub, and engaging the laterally directed part of the wheel hub for retaining the wheel hub upon the hub drum, the arrangement being such that the outer end of the wheel hub is left free for engagement with a cap.

WILLIAM SHIRLEY SNOW